US012606212B2

(12) United States Patent (10) Patent No.: US 12,606,212 B2

Nagata et al. (45) Date of Patent: Apr. 21, 2026

(54) OPERATION SUPPORT DEVICE, SYSTEM, NON-TEMPORARY STORAGE MEDIUM, AND OPERATION SUPPORT METHOD

(71) Applicants: TOYOTA JIDOSHA KABUSHIKI KAISHA, Toyota (JP); DENSO CORPORATION, Kariya (JP)

(72) Inventors: Yu Nagata, Chofu (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 191 days.

(21) Appl. No.: 18/421,076

(22) Filed: Jan. 24, 2024

(65) Prior Publication Data

US 2024/0262394 A1 Aug. 8, 2024

(30) Foreign Application Priority Data

Feb. 2, 2023 (JP) ................................. 2023-014902

(51) Int. Cl.
*B60W 60/00* (2020.01)
*B60W 30/18* (2012.01)
*B60W 50/00* (2006.01)

(52) U.S. Cl.
CPC ................. *B60W 60/00274* (2020.02); *B60W 30/18163* (2013.01); *B60W 50/0097* (2013.01); *B60W 60/0021* (2020.02); *B60W 2552/53* (2020.02); *B60W 2554/402* (2020.02); *B60W 2556/10* (2020.02)

(58) Field of Classification Search
CPC ....... B60W 60/00274; B60W 60/0021; B60W 30/18163; B60W 50/0097; B60W 2554/402; B60W 2556/10; B60W 2552/53

See application file for complete search history.

(56) References Cited

U.S. PATENT DOCUMENTS

| | | | | |
|---|---|---|---|---|
| 9,275,136 | B1 * | 3/2016 | Sharifi .................. | G10L 19/022 |
| 10,008,111 | B1 * | 6/2018 | Grant .................... | G08G 1/166 |
| 10,156,848 | B1 * | 12/2018 | Konrardy ............. | G06Q 50/163 |
| 10,328,897 | B1 * | 6/2019 | Nabbe ................... | B60W 30/10 |
| 10,565,873 | B1 * | 2/2020 | Christensen ........... | G05D 1/617 |
| 2016/0093213 | A1 * | 3/2016 | Rider .................... | H04W 4/027 |
| | | | | 701/537 |
| 2018/0233047 | A1 * | 8/2018 | Mandeville-Clarke ...................... | |
| | | | | B60W 30/00 |
| 2019/0039613 | A1 * | 2/2019 | Lee ........................ | G08G 1/167 |
| 2022/0074758 | A1 * | 3/2022 | Sameer ................. | G06N 20/10 |

(Continued)

FOREIGN PATENT DOCUMENTS

JP 2022-058001 A 4/2022

*Primary Examiner* — Peter D Nolan
*Assistant Examiner* — Wae L Louie
(74) *Attorney, Agent, or Firm* — Oliff PLC

(57) ABSTRACT

An operation support device operates a vehicle by autonomous driving. The operation support device includes a control unit that acquires appearance data indicating an appearance history of emergency vehicles for each of a plurality of links forming a route through which the vehicle is expected to pass, predicts, for each of the links, the number of appearances of emergency vehicles while the vehicle is traveling, based on the acquired appearance data, and adjusts an operation plan of the vehicle according to the predicted number of appearances for each of the links.

20 Claims, 3 Drawing Sheets

(56) References Cited

U.S. PATENT DOCUMENTS

| 2022/0099446 | A1  |  3/2022 | Higashide et al. |
| 2022/0219701 | A1* |  7/2022 | Chikamori ......... B60W 30/182 |
| 2022/0223041 | A1* |  7/2022 | Chikamori ....... G08G 1/096811 |
| 2022/0319336 | A1* | 10/2022 | Averbuch ............. G08G 1/0141 |
| 2022/0373338 | A1* | 11/2022 | Al-Dahle ................. G06N 3/08 |
| 2023/0062200 | A1* |  3/2023 | Stenneth ............ G01C 21/3461 |
| 2023/0169845 | A1* |  6/2023 | Turner ................. G08B 25/016 |
|              |     |         | 455/404.1 |
| 2023/0417565 | A1* | 12/2023 | Saxena ........... B60W 30/18018 |
| 2024/0144741 | A1* |  5/2024 | Han .................... B60W 60/001 |
| 2024/0193956 | A1* |  6/2024 | Houts ................... G06V 20/56 |

* cited by examiner

OPERATION SUPPORT DEVICE, SYSTEM, NON-TEMPORARY STORAGE MEDIUM, AND OPERATION SUPPORT METHOD

CROSS-REFERENCE TO RELATED APPLICATION

This application claims priority to Japanese Patent Application No. 2023-014902 filed on Feb. 2, 2023, incorporated herein by reference in its entirety.

BACKGROUND

1. Technical Field

The present disclosure relates to an operation support device, a system, a non-temporary storage medium, and an operation support method.

2. Description of Related Art

Japanese Unexamined Patent Application Publication No. 2022-058001 discloses an operation management device that acquires an image of a road obstacle from a vehicle and outputs an instruction to eliminate the road obstacle based on the image of the road obstacle.

SUMMARY

When a vehicle such as a regularly operated bus encounters an emergency vehicle, giving priority to the emergency vehicle may disrupt an operation schedule of the vehicle.

The present disclosure provides an operation support device, a system, a non-temporary storage medium, and an operation support method that make it difficult for an operation schedule of a vehicle to be disrupted.

A first aspect of the present disclosure relates to an operation support device that operates a vehicle by autonomous driving, the operation support device including a control unit. The control unit is configured to acquire appearance data indicating an appearance history of a plurality of emergency vehicles for each of a plurality of links forming a route through which the vehicle is expected to pass, predict, for each of the links, the number of appearances of emergency vehicles while the vehicle is traveling, based on the acquired appearance data, and adjust an operation plan of the vehicle according to the predicted number of appearances for each of the links.

In the operation support device according to the first aspect, a lane in which an emergency vehicle travels may be determined in advance, and the control unit may be configured to adjust the operation plan by specifying, among the links, a link of which the number of appearances is equal to or greater than a threshold, and setting a travel lane of the vehicle on the specified link to a lane different from the lane in which the emergency vehicle travels.

In the operation support device according to the first aspect, the control unit may be configured to adjust the operation plan by specifying, among the links, a link of which the number of appearances is equal to or greater than a threshold, and increasing an expected time required to travel from a first node to a second node that is connected to the first node connected by the specified link.

In the operation support device according to the first aspect, the links may include one or more candidate links connecting the same nodes, and the control unit may be configured to adjust the operation plan by making a comparison of the number of appearances among the candidate links, and selecting a link with the smallest number of appearances as a link forming an operation route of the vehicle.

In the operation support device according to the first aspect, the links may include one or more candidate links connecting the same nodes, and the control unit may be configured to adjust the operation plan by determining whether there is an emergency vehicle approaching the vehicle after the vehicle has started operation, specifying, when the control unit determines that there is an approaching emergency vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

In the operation support device according to the first aspect, the control unit may be configured to make a comparison of the number of appearances among the candidate links different from the first link, and select a link with the smallest number of appearances as the second link.

In the operation support device according to the first aspect, the control unit may be configured to make a comparison of a loss time among the candidate links, and select a link with the shortest loss time as the second link.

In the operation support device according to the first aspect, the control unit may be configured to further acquire environmental data indicating environmental conditions when the vehicle is operated, and to predict the number of appearances further based on the acquired environmental data.

In the operation support device according to the first aspect, the control unit may be configured to predict the number of appearances by weighting the appearance history of the emergency vehicles indicated by the appearance data according to the environmental conditions indicated by the environmental data.

A second aspect of the disclosure relates to a system including the operation support device according to the first aspect, and a vehicle. The vehicle receives the operation plan from the operation support device and travels according to the received operation plan.

A third aspect of the disclosure relates to a non-temporary storage medium that stores an instruction executable by one or more processors that function as an operation support device that operates a vehicle by autonomous driving and causes the one or more processors to perform the following functions. The functions cause a computer functioning as the operation support device that operates the vehicle by autonomous driving to:

acquire appearance data indicating an appearance history of emergency vehicles for each of a plurality of links forming a route through which the vehicle is expected to pass;

predict, for each of the links, the number of appearances of the emergency vehicles while the vehicle is traveling, based on the acquired appearance data; and adjust an operation plan of the vehicle according to the predicted number of appearances for each of the links.

In the non-temporary storage medium according to the third aspect, a lane in which the emergency vehicle travels may be determined in advance, and the operation plan of the vehicle may be adjusted by specifying, among the links, a link of which the number of appearances is equal to or greater than a threshold, and setting a travel lane of the vehicle on the specified link to a lane different from the lane in which the emergency vehicle travels.

In the non-temporary storage medium according to the third aspect, the operation plan of the vehicle may be adjusted by specifying, among the links, a link of which the number of appearances is equal to or greater than a threshold, and increasing an expected time required to travel from a first node to a second node that is connected to the first node by the specified link.

In the non-temporary storage medium according to the third aspect, the links may include one or more candidate links connecting the same nodes, and the operation plan of the vehicle may be adjusted by making a comparison of the number of appearances among the candidate links, and selecting a link with the smallest number of appearances as a link forming an operation route of the vehicle.

In the non-temporary storage medium according to the third aspect, the links may include one or more candidate links connecting the same nodes, and the operation plan of the vehicle may be adjusted by determining whether there is an emergency vehicle approaching the vehicle after the vehicle has started operation, specifying, when it is determined that there is the emergency vehicle approaching the vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

In the non-temporary storage medium according to the third aspect, the function may include further acquiring environmental data indicating environmental conditions when the vehicle is operated, and predicting the number of appearances further based on the acquired environmental data.

A fourth aspect of the disclosure relates to an operation support method for operating a vehicle by autonomous driving, the operation support method including:

acquiring appearance data indicating an appearance history of emergency vehicles for each of a plurality of links forming a route through which the vehicle is expected to pass by a control unit;

predicting, for each of the links, the number of appearances of the emergency vehicles while the vehicle is traveling, based on the acquired appearance data by the control unit; and adjusting an operation plan of the vehicle according to the predicted number of appearances for each of the links by the control unit.

In the operation support method according to the fourth aspect, a lane in which the emergency vehicle travels may be determined in advance, and the operation plan of the vehicle may be adjusted by the control unit by specifying, among the links, a link of which the number of appearances is equal to or greater than a threshold, and setting a travel lane of the vehicle on the specified link to a lane different from the lane in which the emergency vehicle travels.

In the operation support method according to the fourth aspect, the operation plan of the vehicle may be adjusted by the control unit by specifying, among the links, a link of which the number of appearances is equal to or greater than a threshold, and increasing an expected time required to travel from a first node to a second node that is connected to the first node by the specified link.

In the operation support method according to the fourth aspect, the links may include one or more candidate links connecting the same nodes, and the operation plan of the vehicle may be adjusted by determining, through the control unit, whether there is an emergency vehicle approaching the vehicle after the vehicle has started operation, specifying, when the control unit determines that there is an approaching emergency vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

According to each aspect of the present disclosure, it becomes difficult for an operation schedule of a vehicle to be disrupted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
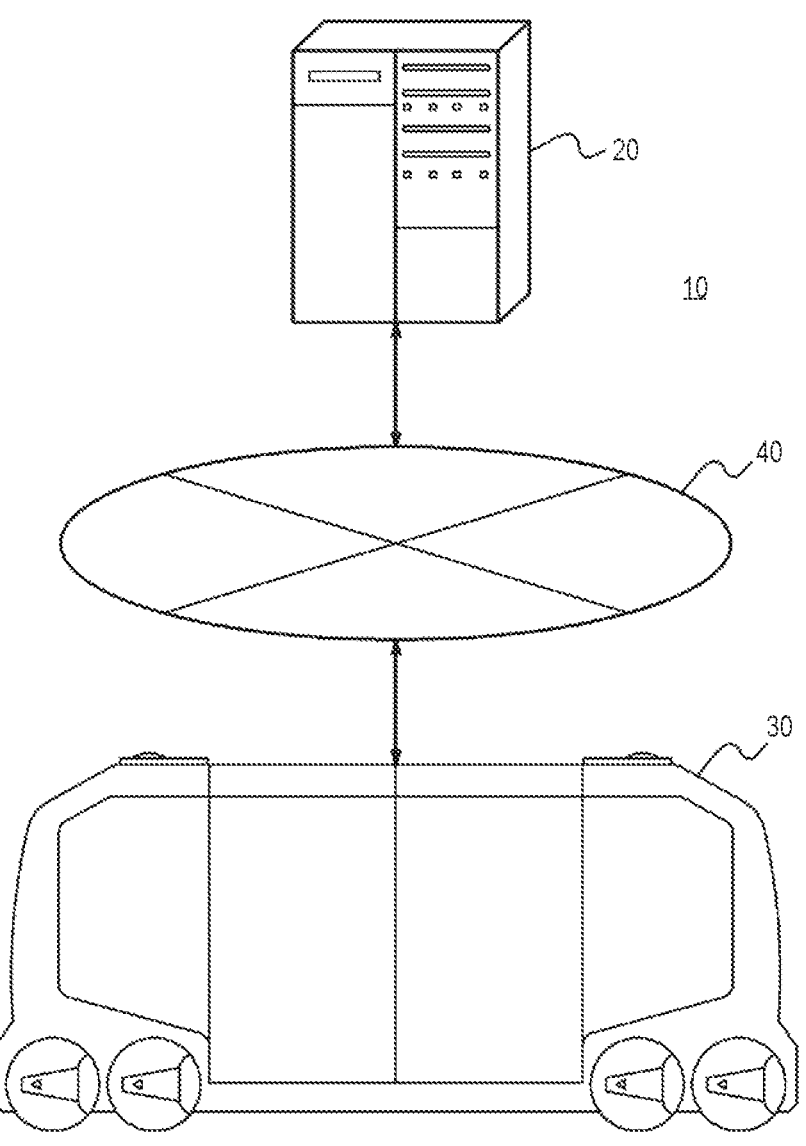
FIG. 1 is a diagram illustrating a configuration of a system according to an embodiment of the present disclosure.

An embodiment of the present disclosure will be described below with reference to the drawings.

In each figure, the same reference numerals are given to the same or corresponding parts. In the description of the present embodiment, the description of the same or corresponding parts will be omitted or simplified as appropriate.

The configuration of a system 10 according to the present embodiment will be described with reference to FIG. 1.

The system 10 according to the present embodiment includes an operation support device 20 and one or more vehicles 30. The system 10 is used for providing mobility services such as MaaS. "MaaS" is an abbreviation for Mobility-as-a-Service.

The operation support device 20 can communicate with the vehicle 30 via a network 40 such as the Internet.

The operation support device 20 is installed in a facility such as a data center and operated by an operation support person who manages the system 10. The operation support device 20 is, for example, a computer such as a server belonging to a cloud computing system or other computing system. The operation support device 20 may be installed in a management room of the system 10 and used by the operation support person. Alternatively, the operation support device 20 installed in the management room may be shared by two or more operation support people. In the present embodiment, the operation support device 20 operates the vehicle 30 by autonomous driving according to an operation plan PL.

The vehicle 30 is, for example, any type of automobile, such as a gasoline vehicle, a diesel vehicle, a hydrogen vehicle, an HEV, a PHEV, a BEV, or an FCEV. "HEV" is an abbreviation for hybrid electric vehicle. "PHEV" is an abbreviation for plug-in hybrid electric vehicle. "BEV" is an abbreviation for battery electric vehicle. "FCEV" is an abbreviation for fuel cell electric vehicle. The vehicle 30 is a MaaS-dedicated vehicle in the present embodiment, but may be an AV of which the operation is automated at any level. "AV" is an abbreviation for autonomous vehicle. The level of automation is, for example, one of level 1 to level 5 under the SAE classification. "SAE" is an abbreviation for Society of Automotive Engineers.

The network 40 includes the Internet, at least one WAN, at least one MAN, or combinations thereof. "WAN" is an abbreviation for wide area network. "MAN" is an abbreviation for metropolitan area network. The network 40 may include at least one wireless network, at least one optical network, or a combination thereof. A wireless network is, for example, an ad-hoc network, a cellular network, a wireless LAN, a satellite communication network, or a terrestrial microwave network. "LAN" is an abbreviation for local area network.

An overview of the present embodiment will be described with reference to FIG. 1.

In the system 10, the operation support device 20 functions as a mobility service platform. As an overview, the operation support device 20 determines the operation plan PL of the vehicle 30, and operates the vehicle 30 by autonomous driving according to the determined operation plan PL.

The vehicle 30 is, in the present embodiment, a bus that transports one or more passengers. The operation support device 20 operates the vehicle 30 as a regularly operated bus that travels by autonomous driving according to the operation plan PL. A route R1 along which the vehicle 30 is expected to pass is composed of a plurality of links. For example, the plurality of links forming the route R1 include a link having a departure point and a destination of the vehicle 30 as nodes. The number of links having the departure point and the destination as nodes is not limited to one, and may include a plurality of links. Also, a waypoint of the vehicle 30 may be set as a node. The waypoint of the vehicle 30 is, for example, a stop.

In the present embodiment, the vehicle 30 is equipped with an information processing device. The information processing device is, for example, a computer in which automatic operation control software is installed, and a device that can be equipped with sensors such as a camera and LiDAR, but is not limited to this and may be any device. The information processing device is mounted on any part of the vehicle 30, such as a rooftop of the vehicle 30, for example. The information processing device performs vehicle control based on commands from the operation support device 20. For example, information indicating the operation plan PL of the vehicle 30 is transmitted from the operation support device 20 to the information processing device. The information processing device controls the operation of the vehicle 30 based on the transmitted operation plan PL. As a result, the vehicle 30 travels according to the operation plan PL. The operation plan PL includes, for example, information indicating an operation route R2 of the vehicle 30, information indicating a lane in which the vehicle 30 travels on each link, information indicating an expected time required to travel between nodes for each link, and information indicating a waiting time of the vehicle 30 at each node. The information processing device may acquire position data of the vehicle 30, the name of a stop where the vehicle 30 stops, or data indicating the departure/arrival state of the vehicle 30, and transmit the acquired information to the operation support device 20 as operation status data. Alternatively, the information processing device may acquire data indicating the surrounding conditions of the vehicle 30 and transmit the acquired data to the operation support device 20 as surrounding data d1. The surrounding data d1 will be described below.

While the vehicle 30 is traveling by autonomous driving, it may encounter an emergency vehicle such as an ambulance. Prioritizing emergency vehicles is a rule stipulated in Japan's Road Traffic Act, and even autonomous driving vehicles must comply. Examples of avoidance control by autonomous driving when encountering an emergency vehicle include methods such as maintaining a distance from the emergency vehicle and stopping temporarily, turning on the hazard lights, or not entering an intersection. However, performing such avoidance control in an autonomous driving vehicle has disadvantages such as complicated processing and high power consumption for calculation. Further, when the vehicle 30 encounters an emergency vehicle, the avoidance control as described above takes time, and the operation schedule of the vehicle 30 may be disrupted. Furthermore, depending on the environmental conditions, for example, when the road is congested or when it is raining, the control for avoiding the emergency vehicle may become more complicated. Therefore, in order to make it difficult for the operation schedule of the vehicle 30 to be disrupted, it is desirable to establish the operation plan PL that avoids encountering emergency vehicles as much as possible.

In the present embodiment, "emergency vehicle" includes public emergency vehicles and private emergency vehicles. Public emergency vehicles are, for example, police vehicles, fire fighting vehicles, rescue vehicles, imperial guard police vehicles, military police vehicles, chemical reconnaissance vehicles, highway road patrol vehicles, and the like. Private emergency vehicles are, for example, emergency work vehicles of electric power companies, gas companies, or water companies, tow trucks, cars belonging to doctors of hospitals, and the like. An "emergency vehicle" may include a Red Cross blood center or pharmaceutical company transfusion or organ delivery vehicle.

In the present embodiment, the operation support device 20 operates the vehicle 30 by automatic driving. The operation support device 20 acquires appearance data D1 indicating the appearance history of emergency vehicles for each of the links forming the route R1 through which the vehicle 30 is expected to pass. The operation support device 20 predicts, for each link, the number N of appearances of emergency vehicles while the vehicle 30 is traveling, based on the acquired appearance data D1. The operation support device 20 adjusts the operation plan PL of the vehicle 30 according to the predicted number of appearances per link.

According to the present embodiment, the operation plan PL of the vehicle 30 is adjusted according to the number of appearances of predicting the number N of appearances of emergency vehicles on each link while the vehicle 30 is traveling. For example, by specifying a link where the number N of appearances is equal to or greater than a threshold TH, and setting a travel lane X1 of the vehicle 30 to a different lane from a travel lane X2 of the emergency vehicle in the specified link, the probability that the vehicle 30 will encounter an emergency vehicle can be reduced. This is because when the vehicle 30 does not encounter an emergency vehicle, the time and effort that would have been required for control to avoid the emergency vehicle during operation of the vehicle 30 will be reduced, and the operation schedule of the vehicle 30 will be less likely to be disrupted. In addition, by specifying a link of which the number N of appearances is equal to or greater than the threshold TH, and extending the expected time required to travel from a first node N1 to a second node N2 that connects the specified link, even when the vehicle 30 encounters an emergency vehicle and avoidance control takes time, the operation schedule of the vehicle 30 is less likely to be disrupted. Alternatively, when there are one or more candidate links connecting the same nodes, the link with the smallest number N of appearances among the candidate links is selected as the link forming an operation route R2 of the vehicle 30, thereby reducing the probability that the vehicle 30 will encounter an emergency vehicle. In this way, by adjusting the operation plan PL of the vehicle 30 according to the predicted number of appearance for each link, the number N of appearances of emergency vehicles while the vehicle 30 is traveling, it is possible to prevent the operation schedule of the vehicle 30 from being disrupted.

Figure 2:
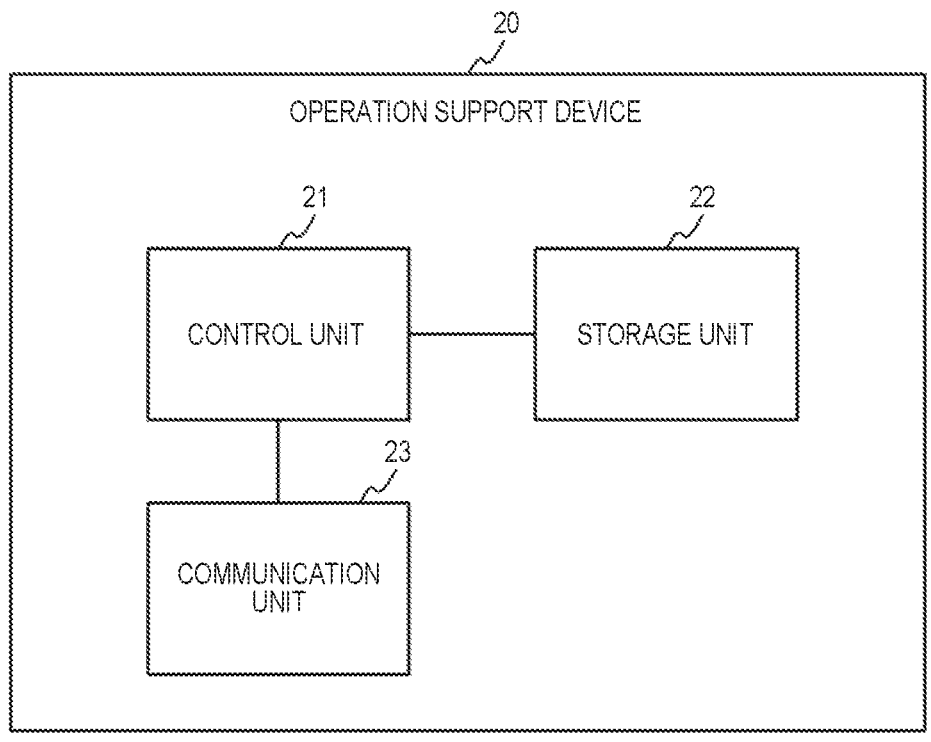
FIG. 2 is a block diagram illustrating a configuration of an operation support device according to the embodiment of the present disclosure.

The configuration of the operation support device 20 according to the present embodiment will be described with reference to FIG. 2.

The operation support device 20 includes a control unit 21, a storage unit 22, and a communication unit 23.

The control unit 21 includes at least one processor, at least one programmable circuit, at least one dedicated circuit, or any combination thereof. A processor may be a general-purpose processor such as a CPU or GPU, or a dedicated processor specialized for a specific process. "CPU" is an abbreviation for central processing unit. "GPU" is an abbreviation for graphics processing unit. A programmable circuit is, for example, an FPGA. "FPGA" is an abbreviation for field-programmable gate array. A dedicated circuit is, for example, an ASIC. "ASIC" is an abbreviation for application specific integrated circuit. The control unit 21 executes processing related to the operation of the operation support device 20 while controlling each unit of the operation support device 20.

The storage unit 22 includes at least one semiconductor memory, at least one magnetic memory, at least one optical memory, or any combination thereof. A semiconductor memory is, for example, a RAM or a ROM. "RAM" is an abbreviation for random access memory. "ROM" is an abbreviation for read only memory. RAM is, for example, SRAM or DRAM. "SRAM" is an abbreviation for static random access memory. "DRAM" is an abbreviation for dynamic random access memory. ROM is, for example, EEPROM. "EEPROM" is an abbreviation for electrically erasable programmable read only memory. The storage unit 22 functions, for example, as a main storage device, an auxiliary storage device, or a cache memory. The storage unit 22 stores data used for the operation of the operation support device 20 and data obtained by the operation of the operation support device 20. In the present embodiment, the storage unit 22 stores the appearance data D1, for example. The appearance data D1 is data indicating the appearance history of the emergency vehicles for each of a plurality of links forming the route R1 through which the vehicle 30 is expected to pass. The storage unit 22 may further store environmental data D2, for example. The environmental data D2 is data indicating environmental conditions that can occur on at least one of a plurality of links forming the route R1 on which the vehicle 30 is expected to travel.

The communication unit 23 includes at least one communication interface. The communication interface is, for example, a LAN interface. The communication unit 23 receives data used for the operation of the operation support device 20 and transmits data obtained by the operation of the operation support device 20. In the present embodiment, the communication unit 23 communicates with the vehicle 30.

Functions of the operation support device 20 are realized by executing a program according to the present embodiment by a processor acting as the control unit 21. That is, the functions of the operation support device 20 are realized by software. The program causes the computer to function as the operation support device 20 by causing the computer to perform the operation of the operation support device 20. That is, the computer functions as the operation support device 20 by executing the operation of the operation support device 20 according to the program.

The program can be stored on a non-temporary computer readable medium. A non-temporary computer readable medium is, for example, a flash memory, a magnetic recording device, an optical disk, a magneto-optical recording medium, or a ROM. Program distribution is performed, for example, by selling, assigning, or lending a portable medium such as an SD card, DVD, or CD-ROM storing the program. "SD" is an abbreviation for Secure Digital. "DVD" is an abbreviation for digital versatile disc. "CD-ROM" is an abbreviation for compact disc read only memory. The program may be distributed by storing the program in the storage of the server and transferring the program from the server to another computer. A program may be provided as a program product.

A computer temporarily stores, for example, a program stored in a portable medium or a program transferred from a server in a main storage device. Then, the computer reads the program stored in the main storage device via the processor, and executes processing according to the read program via the processor. The computer may read the program directly from the portable medium and execute processing according to the program. The computer may execute processing according to the received program every time the program is transferred from the server to the computer. The processing may be executed by a so-called ASP type service that realizes the function only by executing the execution instruction and acquiring the result without transferring the program from the server to the computer. "ASP" is an abbreviation for application service provider. A program includes information to be used for processing by an electronic computing device and that which is equivalent to a program. For example, data that is not a direct instruction to a computer but that has the property of prescribing the processing of the computer corresponds to "things equivalent to the program".

Part or all of the functions of the operation support device 20 may be realized by a programmable circuit as the control unit 21 or a dedicated circuit. That is, part or all of the functions of the operation support device 20 may be realized by hardware.

The operation of the operation support device 20 according to the present embodiment will be described with reference to FIGS. 3 and 4. This operation corresponds to an operation support method according to the present embodiment.

Figure 3:
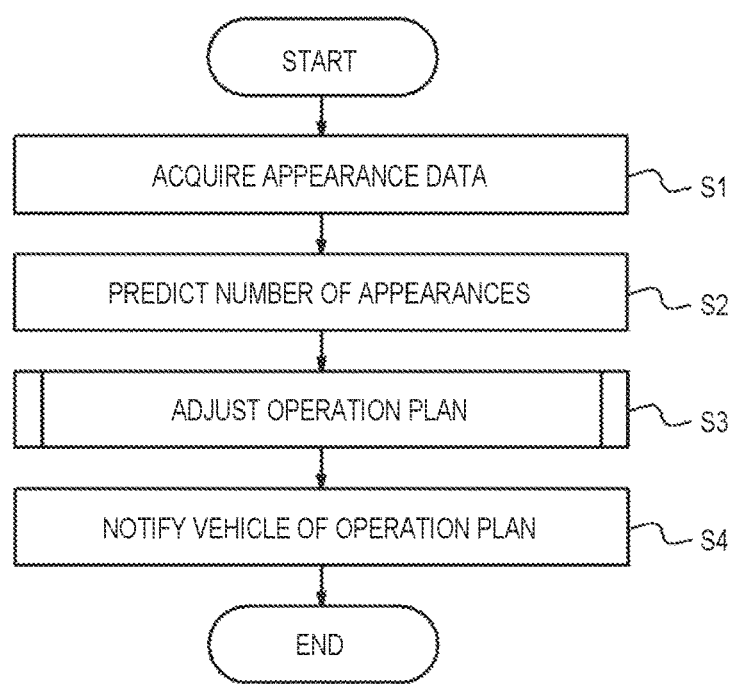
FIG. 3 is a flowchart illustrating an operation of the operation support device according to the embodiment of the present disclosure.

In step S1 of FIG. 3, the control unit 21 of the operation support device 20 acquires the appearance data D1 indicating the appearance history of emergency vehicles for each of the links forming the route R1 through which the vehicle 30 is expected to pass. In the present embodiment, the emergency vehicle appearance history is a history of the number of times emergency vehicles have passed through each link per unit period. The unit period can be arbitrarily set, for example, one day, one week, or one month. The appearance history may include information such as the date and time when the emergency vehicle appeared. The appearance data D1 may be acquired by any procedure, but is acquired by the following procedure, for example, when the emergency vehicle is a public emergency vehicle, the control unit 21 may acquire the appearance data D1 stored in the storage unit 22 in advance. The appearance data D1 may be, for example, performance report data provided by the Fire and Disaster Management Agency of Japan's Ministry of Internal Affairs and Communications. Performance report data may be provided by other devices connected to the network 40. The control unit 21 may analyze images captured by a road monitoring management camera of a municipality to detect the passage of the emergency vehicle, and acquire data indicating the number of detections as the appearance data D1. Alternatively, the control unit 21 may detect the passage of an emergency vehicle by analyzing a video of a drive recorder mounted on a vehicle VH under the control of the operation support device 20. The vehicle 30 may be included in the vehicle VH. The control unit 21 may detect the passage of an emergency vehicle by analyzing images detected by an imaging sensor or the like mounted on each vehicle VH. The control unit 21 may acquire operation management data d2 indicating the operation performance of the vehicle 30, and detect the passage of an emergency vehicle based on a delay status of the vehicle 30 indicated by the acquired operation management data d2.

In step S2 of FIG. 3, the control unit 21 of the operation support device 20 predicts, for each link, the number N of appearances of emergency vehicles while the vehicle 30 is traveling based on the appearance data D1 acquired in step S1. The number N of appearances on each link may be predicted by any procedure. For example, the control unit 21 predicts the number N of appearances for each link by statistically processing the appearance history of emergency vehicles for each link indicated by the appearance data D1. The control unit 21 associates the predicted number N of appearances with each link. Specifically, the control unit 21 plots the predicted number N of appearances for each link. When the appearance history includes information such as the date and time when the emergency vehicle appeared, the control unit 21 may determine the date and time when the vehicle 30 is expected to travel, and statistically process the appearance history of the emergency vehicle corresponding to the determined date and time, thereby predicting the number N of appearances for each link.

In step S3 in FIG. 3, the control unit 21 of the operation support device 20 adjusts the operation plan PL of the vehicle 30 according to the number of appearances for each link predicted in step S2. Specifically, as a first procedure that adjusts the operation plan PL, among a plurality of links, the control unit 21 adjusts the operation plan PL by specifying a link in which the number N of appearances is equal to or greater than the threshold TH and setting the travel lane X1 of the vehicle 30 in the specified link to a lane different from the travel lane X2 of the emergency vehicle. For example, it is assumed that the travel lane X2 for emergency vehicles is determined in advance. As an example, when the specified link includes the first lane and the second lane, and when the first lane is defined as the travel lane X2 of the emergency vehicle, the control unit 21 sets the second lane in the specified link as the travel lane X1 of the vehicle 30. The threshold TH can be an arbitrary value, but can be, for example, the average value of the number N of appearances per link per unit period. Such a configuration can reduce the probability that the vehicle 30 will encounter an emergency vehicle. Therefore, the time and effort that would have been required for the control to avoid the emergency vehicle while the vehicle 30 is in operation is reduced, such that the operation schedule of the vehicle 30 is less likely to be disrupted.

As a second procedure that adjusts the operation plan PL in step S3 of FIG. 3, the control unit 21 of the operation support device 20 may extend the expected time required to travel from the first node N1 to the second node N2 connected by the specified link. As an example, it is assumed that the first node N1 is the departure point of the vehicle 30 and the second node N2 is the destination of the vehicle 30. Further, when the length of the specified link, that is, the distance from the first node N1 to the second node N2 is Y, and the departure time of the vehicle 30 from the departure point is T1, the control unit 21 delays an arrival time T2 at the destination to lengthen the expected time required to travel. Specifically, the control unit 21 calculates the predicted arrival time of the vehicle 30 at the second node N2 based on the distance Y and the standard traveling speed of the vehicle 30, and sets the arrival time T2 to be later than the calculated time. When the first node N1 is the departure point of the vehicle 30 and the second node N2 is a stop which is a waypoint of the vehicle 30, the control unit 21 may lengthen the expected time required to travel by making the waiting time of the vehicle 30 at the second node N2 longer than the predetermined standard waiting time. Alternatively, when the first node N1 is a stop of the vehicle 30 and the second node N2 is the destination of the vehicle 30, the control unit 21 may lengthen the expected time required to travel by making the waiting time of the vehicle 30 at the first node N1 longer than a predetermined standard waiting time. By lengthening the expected time required to travel between nodes in this way, it is possible to offset the delay caused by the vehicle 30 encountering an emergency vehicle and time taken for the avoidance control. Therefore, the operation schedule of the vehicle 30 is less likely to be disrupted.

As a third procedure that adjusts the operation plan PL in step S3 of FIG. 3, the control unit 21 of the operation support device 20 may compare one or more candidate links connecting the same nodes among the plurality of links in terms of the number N of appearances for each candidate link, and select the link with the smallest number N of appearances as the link that configures the operation route R2 of the vehicle 30. Such a configuration can reduce the probability that the vehicle 30 will encounter an emergency vehicle. Therefore, the time and effort that would have been required for the control to avoid the emergency vehicle while the vehicle 30 is in operation is reduced, such that the operation schedule of the vehicle 30 is less likely to be disrupted.

As a modification example of the present embodiment, the threshold TH may be provided stepwise, in ascending order of a first threshold TH1, a second threshold TH2, . . . , and the procedure that adjusts the operation plan PL may differ for each step. Specifically, in step S3 of FIG. 3, the control unit 21 may specify links of which the number N of appearances is equal to or greater than the first threshold TH1, and may further specify links of which the number N of appearances is equal to or greater than the second threshold TH2. Then, the control unit 21 may perform the above-described first procedure for links of which the number N of appearances is equal to or greater than the first threshold TH1, and may further perform the second procedure in addition to the above-described first procedure for links of which the number N of appearances is equal to or greater than the second threshold TH2.

In step S4 of FIG. 3, the control unit 21 of the operation support device 20 notifies the vehicle 30 of the operation plan PL adjusted in step S3. Specifically, the control unit 21 transmits data indicating the operation plan PL to an information processing device mounted on the vehicle 30 via the communication unit 23. The information processing device operates the vehicle 30 according to the operation plan PL indicated by the transmitted data.

As described above, the operation support device 20 according to the present embodiment operates the vehicle 30 by autonomous driving. The operation support device 20 acquires the appearance data D1 indicating the appearance history of the emergency vehicles for each of the links forming the route R1 through which the vehicle 30 is expected to pass. The operation support device 20 predicts the number N of appearances of emergency vehicles while the vehicle 30 is traveling for each link based on the acquired appearance data D1. The operation support device 20 adjusts the operation plan PL of the vehicle 30 according to the predicted number of appearances per link.

According to this configuration, the operation plan PL of the vehicle 30 is adjusted based on the number N of appearances of emergency vehicles expected to appear while the vehicle 30 is in operation. As a result, the operation schedule of the vehicle 30 is less likely to be disrupted.

As a modification example of the embodiment described above, the control unit 21 of the operation support device 20 may determine whether there is an emergency vehicle approaching the vehicle 30 after the vehicle 30 has started operation. Next, when the control unit 21 determines that there is an approaching emergency vehicle, the control unit 21 may further adjust the operation plan PL by specifying, as a first link L1, a link where the emergency vehicle and the vehicle 30 are expected to encounter each other among a plurality of links, and selecting, among one or more candidate links CL connecting the same nodes as those connected by the specified first link L1, one of candidate links CL' different from the first link L1 as a second link L2 forming an operation route R2' of the vehicle 30. Specifically, the control unit 21 of the operation support device 20 may further perform steps S31 to S34 of FIG. 4 as processing that adjusts the operation plan PL in step S3 of FIG. 3 after the operation of the vehicle 30 is started.

Figure 4:
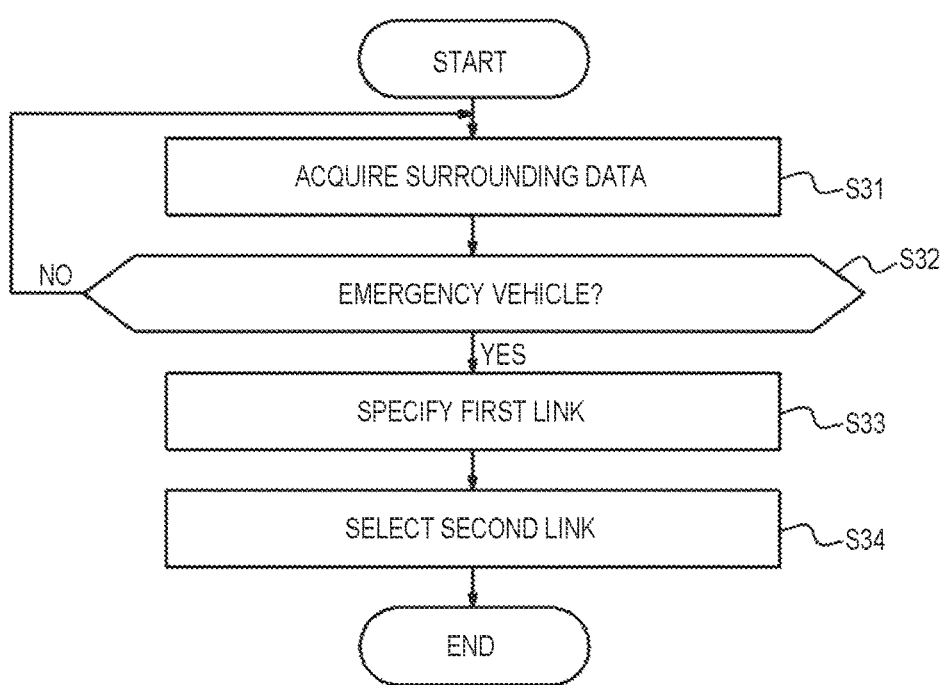
FIG. 4 is a flowchart illustrating another operation of the operation support device according to the embodiment of the present disclosure.

In step S31 of FIG. 4, when the control unit 21 of the operation support device 20 detects that the vehicle 30 has started operation, it acquires the surrounding data d1 indicating the surrounding conditions of the vehicle 30. In the present embodiment, the surroundings of the vehicle 30 refer to areas within a certain distance S from the vehicle 30. The distance S may be arbitrarily determined within a range in which the emergency vehicle can reach the vehicle 30 within Q minutes when there is an emergency vehicle around the vehicle 30. The surrounding data d1 may be acquired by any procedure. For example, the control unit 21 of the operation support device 20 receives the surrounding data d1 transmitted by the information processing device via the communication unit 23 and acquires the received surrounding data d1. Alternatively, the control unit 21 of the operation support device 20 may communicate with any plurality of vehicles VH under the control of the operation support device 20 via the communication unit 23, and then the control unit 21 may receive images detected by an imaging sensor or the like mounted on each vehicle VH and acquire the received images as the surrounding data d1. The vehicles VH may include the vehicle 30. The control unit 21 may receive a video from a drive recorder mounted on the vehicle VH and acquire the received video as the surrounding data d1.

In step S32 of FIG. 4, the control unit 21 of the operation support device 20 determines whether there is an emergency vehicle approaching the vehicle 30. The control unit 21 determines whether there is an emergency vehicle approaching the vehicle 30 by analyzing the surrounding data d1 in step S31. When the control unit 21 determines in step S32 that there is an emergency vehicle approaching the vehicle 30, the process of step S33 is performed. When it is determined in step S32 that there is no emergency vehicle approaching the vehicle 30, the process returns to step S31 and the process is performed again.

In step S33 of FIG. 4, the control unit 21 of the operation support device 20 specifies, as the first link L1, the link where the emergency vehicle detected in step S32 and the vehicle 30 are expected to encounter each other among the plurality of links. Specifically, the control unit 21 detects the position and traveling direction of the emergency vehicle. Although the position and traveling direction of the emergency vehicle may be detected by any procedure, for example, the control unit 21 detects the position and traveling direction of the emergency vehicle based on transaction logs of drive recorders mounted on a plurality of vehicles VH, roadside equipment, or images captured by fixed-point cameras. The control unit 21 determines a predicted route r1 of the emergency vehicle based on the detected position and traveling direction of the emergency vehicle, and specifies the link overlapping the determined predicted route r1 as the first link L1. The control unit 21 may also predict the location and time at which the vehicle 30 will encounter the emergency vehicle.

In step S34 of FIG. 4, the control unit 21 of the operation support device 20 selects, among the one or more candidate links CL connecting the same nodes as those connected by the first link L1 specified in step S33, one of candidate links CL' different from the first link L1 as the second link L2 forming an operation route R2' of the vehicle 30. As an example, it is assumed that the nodes connected by the first link L1 are a first stop and a second stop on the operation route R2' of the vehicle 30. The control unit 21 makes a comparison of the number N of appearances among candidate links CL', which are links connecting the first stop and the second stop and are one or more links different from the first link L1. The control unit 21 selects the link with the smallest number N of appearances from among the candidate links CL' as the second link L2. Alternatively, the control unit 21 may make a comparison of a loss time among the candidate links CL', and select the link with the shortest loss time as the second link L2. Although the loss time for each candidate link CL' can be calculated by any procedure, for example, it can be calculated by obtaining the difference between the expected time required to travel for the first link L1 and the expected time required to travel for each candidate link CL'.

As described above, the control unit 21 of the operation support device 20 determines whether there is an emergency vehicle approaching the vehicle 30 after the vehicle 30 has started operation. When the control unit 21 determines that there is an approaching emergency vehicle, the control unit 21 specifies, as the first link L1, the link where the emergency vehicle and the vehicle 30 are expected to encounter each other, among a plurality of links forming the route R1 on which the vehicle 30 is expected to travel. The control unit 21 adjusts the operation plan PL by selecting, as the second link L2 forming the operation route R2' of the vehicle 30, any one of the candidate links CL' different from the first link L1 among the one or more candidate links CL connecting the same nodes as the two nodes connected by the specified first link L1.

According to this configuration, even when the emergency vehicle is detected after the vehicle 30 has started operation, by predicting the route that the emergency vehicle will pass and selecting a link other than the predicted route as the operation route R2 of the vehicle 30, the operation route R2 of vehicle 30 can be rerouted to the operation route R2'. Therefore, even after the vehicle 30 has started operation, it is possible to avoid encounters between the vehicle 30 and emergency vehicles. Therefore, the operation schedule of the vehicle 30 is less likely to be disrupted.

Another example of the modification example described above will be described. In the modification example described above, when the operation plan PL is adjusted by changing the first link L1 to the second link L2, the arrival at the second stop will be delayed by the loss time of the second link L2. In this case, the control unit 21 of the operation support device 20 may notify the passengers of the vehicle 30. That is, the control unit 21 may notify the passengers of the vehicle 30 when the arrival time of the vehicle 30 at the next node is delayed as a result of adjusting the operation plan PL. Notification to passengers can be done by any procedure. For example, the control unit 21 controls the vehicle 30 to output guidance G that informs of the delay in arrival at the next node. The guidance G includes guidance G1 by means of voice or guidance G2 by means of characters or signs. Although the guidance G may be output by any means, for example when the next node is the second stop, the control unit 21 creates, as the guidance G, a message M1 stating that "arrival at the next stop will be delayed", and transmits the created message M1 to the vehicle 30 via the communication unit 23. Then, an output device such as a speaker provided in the vehicle 30 is controlled so as to output the message M1 as the guidance G via voice. Alternatively, the control unit 21 may control an output device such as a signage provided in the vehicle 30 to output the message M1 as the guidance G via characters. Furthermore, the control unit 21 may calculate an estimated time of arrival at the second stop based on the loss time of the second link L2, and notify the calculated estimated time of arrival together with the message M1. Alternatively, the control unit 21 may notify passengers waiting at the second stop that the vehicle 30 will arrive late. Specifically, the control unit 21 may create a message M1' as guidance G' saying that "the arrival of the bus will be delayed", and control the display of the created message M1' on an output device such as signage installed at the bus stop.

Yet another example of the modification example described above will be described. As a premise, the second procedure in step S3 of FIG. 3 is performed, and when the control unit 21 of the operation support device 20 adjusts the operation plan PL by increasing the expected time required to travel from the first node N1 to the second node N2 connected by the specified link, a margin time is set for the link by lengthening the expected time required to travel. That is, according to the second procedure in step S3 of FIG. 3, a preset margin time is set as a "margin time" in the expected time required to travel of the vehicle 30 in each link. In the modification example described above, when the operation plan PL is adjusted by changing the first link L1 to the second link L2, the arrival at the second stop will be delayed by the loss time of the second link L2. Therefore, in this example, the control unit 21 may offset the delay by shortening the margin time by the loss time. Then, the control unit 21 may notify the passengers of the vehicle 30 when the loss time cannot be offset by shortening the margin time. The control unit 21 compares the loss time with the margin time, and determines that the loss time cannot be offset by shortening the margin time when the loss time exceeds the margin time.

The present disclosure is not limited to the embodiments described above. For example, two or more blocks illustrated in the block diagrams may be combined, or a single block may be split. Instead of executing two or more steps described in the flowchart in chronological order as described, each step may be executed in parallel or in a different order, depending on the processing performance of a device executing each step or as desired. Other modifications are possible without departing from the scope of the present disclosure.

For example, in the above-described embodiment, the control unit 21 of the operation support device 20 may further acquire environmental data D2 indicating environmental conditions when the vehicle 30 is operated in step S1 of FIG. 3, and predict the number N of appearances in step S2 of FIG. 3 further based on the environmental data D2 acquired in step S1. Specifically, the control unit 21 may predict the number N of appearances by weighting the appearance history of emergency vehicles indicated by the appearance data D1 according to environmental conditions indicated by environmental data D2. In the present embodiment, the "environmental conditions" include, for example, the occurrence of an event, the weather, rush hour time period. The environmental data D2 may be acquired by any procedure, but for example, the control unit 21 acquires the environmental data D2 stored in the storage unit 22 in advance. The control unit 21 may acquire, as the environmental data D2, data indicating an event schedule provided by the municipality of the area where the vehicle 30 is expected to travel. Alternatively, the control unit 21 may acquire, as the environmental data D2, weather forecast data provided by the Japan Meteorological Agency, which indicates the weather on the day the vehicle 30 is expected to travel. Alternatively, based on the weather forecast data provided by the Japan Meteorological Agency, the control unit 21 may predict the weather on the day the vehicle 30 is expected to travel, and acquire the data indicating the predicted weather as the environmental data D2. For example, the control unit 21 may predict the rush hour time period based on traffic information provided by a road traffic center that collects road information in Japan, and acquire data indicating the predicted rush hour time period as the environmental data D2. The environmental data D2 may be provided from another device connected to the network 40.

The control unit 21 of the operation support device 20 weights, according to the environmental conditions indicated by the acquired environmental data D2, the number N of appearances predicted by statistically processing the appearance history of emergency vehicles indicated by the appearance data D1. For example, when data indicating an event schedule is acquired as the environmental data D2, the control unit 21 refers to the event schedule indicated by the environmental data D2 and performs weighting so that the number N of appearances predicted for the links around the event site is set to be greater than the value when the event is not held at the link. When an event is held, roads around the event site are expected to be congested. Also, when the number of emergency vehicles dispatched due to the event is expected to increase, and the roads are congested, the control for avoiding emergency vehicles is more complicated than when the road is not congested, so avoidance control takes more time when encountering an emergency vehicle. This is because it is thought that the operation schedule of the vehicle 30 will be further disrupted, so it is necessary to prepare for a more adequate response than usual. Similarly, when data indicating weather is acquired as the environmental data D2, the control unit 21 refers to the environmental data D2, and performs weighting so that the number N of appearances predicted for a link where bad weather such as rain is expected is set to be greater than the value for the link when the weather is not bad. In addition, when the control unit 21 acquires data indicating the rush hour time period as the environmental data D2, the control unit 21 refers to the environmental data D2 and performs weighting so that the predicted number N of appearances for a link where the transit time of the vehicle 30 overlaps with the rush hour time period is set to be greater than the value for the link not in the rush hour time period. For environmental conditions such as bad weather and rush hour, it is also desirable to be prepared to respond more adequately than usual. Then, the control unit 21 predicts the value obtained by weighting as the number N' of appearances.

As described above, the control unit 21 of the operation support device 20 further acquires the environmental data D2 indicating the environmental conditions when the vehicle 30 is operated, and predicts the number N of appearances based on the acquired environmental data D2.

According to such a configuration, the number N' of appearances for each link is predicted by considering environmental conditions. Therefore, the number N of appearances can be determined more accurately. Therefore, the operation schedule of the vehicle 30 is less likely to be disrupted.

Some of the embodiments of the present disclosure are illustrated below. However, it should be noted that the embodiments of the present disclosure are not limited to these.

Embodiment 1

An operation support device that operates a vehicle by autonomous driving, the operation support device comprising a control unit configured to acquire appearance data indicating an appearance history of emergency vehicles for each of a plurality of links forming a route through which the vehicle is expected to pass, predict, for each of the links, the number of appearances of the emergency vehicles while the vehicle is traveling, based on the acquired appearance data, and adjust an operation plan of the vehicle according to the predicted number of appearances for each of the links.

Embodiment 2

The operation support device according to the embodiment 1, wherein:
a lane in which an emergency vehicle travels is determined in advance; and
the control unit is configured to adjust the operation plan by specifying, among the links, a link of which the number of appearances is equal to or greater than a threshold, and setting a travel lane of the vehicle on the specified link to a lane different from the lane in which the emergency vehicle travels.

Embodiment 3

The operation support device according to the embodiment 1 or 2, wherein the control unit is configured to adjust the operation plan by specifying, among the links, a link of which the number of appearances is equal to or greater than a threshold, and increasing an expected time required to travel from a first node to a second node that is connected to the first node by the specified link.

Embodiment 4

The operation support device according to any one of the embodiments 1 to 3, wherein:
the links include one or more candidate links connecting the same nodes; and
the control unit is configured to adjust the operation plan by making a comparison of the number of appearances among the candidate links, and selecting a link with the smallest number of appearances as a link forming an operation route of the vehicle.

Embodiment 5

The operation support device according to any one of the embodiments 1 to 4, wherein:
the links include one or more candidate links connecting the same nodes; and
the control unit is configured to adjust the operation plan by specifying, when emergency data indicating an approaching emergency vehicle is acquired after the vehicle has started operation, among the links, a link in which the emergency vehicle indicated by the emergency data and the vehicle are expected to encounter each other as a first link based on the acquired emergency data, and selecting, among one or more candidate links connecting the same nodes as nodes connected by the specified first link, any one of the candidate links different from the first link as a second link forming an operation route of the vehicle.

Embodiment 6

The operation support device according to any one of the embodiments 1 to 5, wherein the control unit is configured to make a comparison of the number of appearances among the candidate links different from the first link, and select a link with the smallest number of appearances as the second link.

Embodiment 7

The operation support device according to any one of the embodiments 1 to 6, wherein the control unit is configured to compare make a comparison of a loss time among the candidate links, and select a link with the shortest loss time as the second link.

Embodiment 8

The operation support device according to any one of the embodiments 1 to 7, wherein the control unit is configured to further acquire environmental data indicating environmental conditions when the vehicle is operated, and to predict the number of appearances further based on the acquired environmental data.

Embodiment 9

The operation support device according to any one of the embodiments 1 to 8, wherein the control unit is configured to predict the number of appearances by weighting the appearance history of the emergency vehicles indicated by the appearance data according to the environmental conditions indicated by the environmental data.

Embodiment 10

A system, comprising: the operation support device according to any one of the embodiments 1 to 9; and a vehicle that receives the operation plan from the operation support device and travels according to the received operation plan.

Embodiment 11

A non-temporary storage medium storing instructions that are executable by one or more processors that function as an operation support device that operates a vehicle by autonomous driving and that cause the one or more processors to perform functions comprising:

acquiring appearance data indicating an appearance history of emergency vehicles for each of a plurality of links forming a route through which the vehicle is expected to pass;

predicting, for each of the links, the number of appearances of the emergency vehicles while the vehicle is traveling, based on the acquired appearance data; and adjusting an operation plan of the vehicle according to the predicted number of appearances for each of the links.

Embodiment 12

The non-temporary storage medium according to the embodiment 11, wherein:

a lane in which the emergency vehicle travels is determined in advance; and the operation plan of the vehicle is adjusted by specifying, among the links, a link of which the number of appearances is equal to or greater than a threshold, and setting a travel lane of the vehicle on the specified link to a lane different from the lane in which the emergency vehicle travels.

Embodiment 13

The non-temporary storage medium according to the embodiment 11 or 12, wherein the operation plan of the vehicle is adjusted by specifying, among the links, a link of which the number of appearances is equal to or greater than a threshold, and increasing an expected time required to travel from a first node to a second node that is connected to the first node by the specified link.

Embodiment 14

The non-temporary storage medium according to any one of the embodiments 11 to 13, wherein the links include one or more candidate links connecting the same nodes, and the operation plan of the vehicle is adjusted by making a comparison of the number of appearances among the candidate links, and selecting a link with the smallest number of appearances as a link forming an operation route of the vehicle.

Embodiment 15

The non-temporary storage medium according to any one of the embodiments 11 to 14, wherein:

the links include one or more candidate links connecting the same nodes; and the operation plan of the vehicle is adjusted by, specifying, when emergency data indicating an approaching emergency vehicle is acquired after the vehicle has started operation, among the links, a link in which the position of the emergency vehicle indicated by the emergency data and the position of the vehicle overlap, as a first link based on the acquired emergency data, and selecting, among one or more candidate links connecting the same nodes as nodes connected by the specified first link, any one of the candidate links different from the first link as a second link forming an operation route of the vehicle.

Embodiment 16

The non-temporary storage medium according to any one of the embodiments 11 to 15, wherein the function further includes:

further acquiring environmental data indicating an environmental condition when the vehicle is operated; and predicting the number of appearances further based on the acquired environmental data.

Embodiment 17

An operation support method that operates a vehicle by autonomous driving, the operation support method comprising:

acquiring appearance data indicating an appearance history of emergency vehicles for each of a plurality of links forming a route through which the vehicle is expected to pass by a control unit;

predicting, for each of the links, the number of appearances of the emergency vehicles while the vehicle is traveling, based on the acquired appearance data by the control unit; and adjusting an operation plan of the vehicle according to the predicted number of appearances for each of the links by the control unit.

Embodiment 18

The operation support method according to the embodiment 17, wherein:

a lane in which the emergency vehicle travels is determined in advance; and the operation plan of the vehicle is adjusted by the control unit by specifying, among the links, a link of which the number of appearances is equal to or greater than a threshold, and setting a travel lane of the vehicle on the specified link to a lane different from the lane in which the emergency vehicle travels.

Embodiment 19

The operation support method according to the embodiment 17 or 18, wherein the operation plan of the vehicle is adjusted by the control unit by specifying, among the links, a link of which the number of appearances is equal to or greater than a threshold, and increasing an expected time required to travel from a first node to a second node that is connected to the first node by the specified link.

Embodiment 20

The operation support method according to any one of the embodiments 17 to 19, wherein:

the links include one or more candidate links connecting the same nodes, and the operation plan of the vehicle is adjusted by specifying, when emergency data indicating an approaching emergency vehicle is acquired after the vehicle has started operation, among the links, a link in which the position of the emergency vehicle indicated by the emergency data and the position of the vehicle overlap, as a first link based on the acquired emergency data, and selecting, among one or more candidate links connecting the same nodes as nodes connected by the specified first link, any one of the candidate links different from the first link as a second link forming an operation route of the vehicle.

What is claimed is:

1. An operation support device that operates a vehicle by autonomous driving, the operation support device comprising:

a control unit configured to:

acquire appearance data for a predetermined past time period indicating an appearance history of a plurality of emergency vehicles for each of a plurality of links forming a route through which the vehicle is expected to pass;

predict, for each of the links of the route, a future number of appearances of at least one emergency vehicle while the vehicle is traveling, based on the acquired appearance data; and adjust an operation plan of the vehicle according to the predicted number of appearances for each of the links, and control the vehicle to drive autonomously based on the adjusted operation plan.

2. The operation support device according to claim 1, wherein:

a lane in which an emergency vehicle travels is determined in advance; and the control unit is configured to adjust the operation plan by specifying, among the links, a link of which the number of appearances is equal to or greater than a threshold, and setting a travel lane of the vehicle on the specified link to a lane different from the lane in which the emergency vehicle travels.

3. The operation support device according to claim 1, wherein the control unit is configured to adjust the operation plan by specifying, among the links, a link of which the number of appearances is equal to or greater than a threshold, and increasing an expected time required to travel from a first node to a second node that is connected to the first node by the specified link.

4. The operation support device according to claim 1, wherein:

the links include one or more candidate links connecting the same nodes; and the control unit is configured to adjust the operation plan by making a comparison of the number of appearances among the candidate links, and selecting a link with a smallest number of appearances as a link forming an operation route of the vehicle.

5. The operation support device according to claim 1, wherein:

the links include one or more candidate links connecting the same nodes; and the control unit is configured to adjust the operation plan by determining whether there is an emergency vehicle approaching the vehicle after the vehicle has started operation, specifying, when the control unit determines that there is an approaching emergency vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

6. The operation support device according to claim 5, wherein the control unit is configured to make a comparison of the number of appearances among the candidate links different from the first link, and select a link with a smallest number of appearances as the second link.

7. The operation support device according to claim 5, wherein the control unit is configured to make a comparison of a loss time among the candidate links, and select a link with a shortest loss time as the second link.

8. The operation support device according to claim 1, wherein the control unit is configured to further acquire environmental data indicating an environmental condition when the vehicle is operated, and to predict the number of appearances further based on the acquired environmental data.

9. The operation support device according to claim 8, wherein the control unit is configured to predict the number of appearances by weighting the appearance history of the emergency vehicle indicated by the appearance data according to the environmental condition indicated by the environmental data.

10. A system, comprising:

the operation support device according to claim 1; and a vehicle that receives the operation plan from the operation support device and travels according to the received operation plan.

11. A non-temporary storage medium storing instructions that are executable by one or more processors that function as an operation support device that operates a vehicle by autonomous driving and that cause the one or more processors to perform functions comprising:

acquiring appearance data for a predetermined past time period indicating an appearance history of a plurality of emergency vehicles for each of a plurality of links forming a route through which the vehicle is expected to pass;

predicting, for each of the links of the route, a future number of appearances of at least one emergency vehicle while the vehicle is traveling, based on the acquired appearance data; and adjusting an operation plan of the vehicle according to the predicted number of appearances for each of the links, and controlling the vehicle to drive autonomously based on the adjusted operation plan.

12. The non-temporary storage medium according to claim 11, wherein:

a lane in which the emergency vehicle travels is determined in advance; and the operation plan of the vehicle is adjusted by specifying, among the links, a link of which the number of appearances is equal to or greater than a threshold, and setting a travel lane of the vehicle on the specified link to a lane different from the lane in which the emergency vehicle travels.

13. The non-temporary storage medium according to claim 11, wherein the operation plan of the vehicle is adjusted by specifying, among the links, a link of which the number of appearances is equal to or greater than a threshold, and increasing an expected time required to travel from a first node to a second node that is connected to the first node by the specified link.

14. The non-temporary storage medium according to claim 11, wherein:

the links include one or more candidate links connecting the same nodes; and the operation plan of the vehicle is adjusted by making a comparison of the number of appearances among the candidate links, and selecting a link with a smallest number of appearances as a link forming an operation route of the vehicle.

15. The non-temporary storage medium according to claim 11, wherein:

the links include one or more candidate links connecting the same nodes; and the operation plan of the vehicle is adjusted by determining whether there is an emergency vehicle approaching the vehicle after the vehicle has started operation, specifying, when it is determined that there is the emergency vehicle approaching the vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

16. The non-temporary storage medium according to claim 11, wherein the function includes:

further acquiring environmental data indicating an environmental condition when the vehicle is operated; and predicting the number of appearances further based on the acquired environmental data.

17. An operation support method that operates a vehicle by autonomous driving, the operation support method comprising:

acquiring appearance data for a predetermined past time period indicating an appearance history of a plurality of emergency vehicles for each of a plurality of links forming a route through which the vehicle is expected to pass by a control unit;

predicting, for each of the links of the route, a future number of appearances of at least one emergency vehicle while the vehicle is traveling, based on the acquired appearance data by the control unit; and adjusting an operation plan of the vehicle according to the predicted number of appearances for each of the links by the control unit and controlling the vehicle to drive autonomously based on the adjusted operation plan.

18. The operation support method according to claim 17, wherein:

a lane in which the emergency vehicle travels is determined in advance; and the operation plan of the vehicle is adjusted by the control unit by specifying, among the links, a link of which the number of appearances is equal to or greater than a threshold, and setting a travel lane of the vehicle on the specified link to a lane different from the lane in which the emergency vehicle travels.

19. The operation support method according to claim 17, wherein the operation plan of the vehicle is adjusted by the control unit by specifying, among the links, a link of which the number of appearances is equal to or greater than a threshold, and increasing an expected time required to travel from a first node to a second node that is connected to the first node by the specified link.

20. The operation support method according to claim 17, wherein:

the links include one or more candidate links connecting the same nodes; and the operation plan of the vehicle is adjusted by determining, through the control unit, whether there is an emergency vehicle approaching the vehicle after the vehicle has started operation, specifying, when the control unit determines that there is an approaching emergency vehicle, among the links, a link on which the emergency vehicle and the vehicle are expected to encounter each other as a first link, and selecting, among one or more candidate links connecting the same nodes as two nodes connected by the specified first link, any one of the candidate links different from the first link as a second link forming an operation route of the vehicle.

* * * * *